Figure 1:
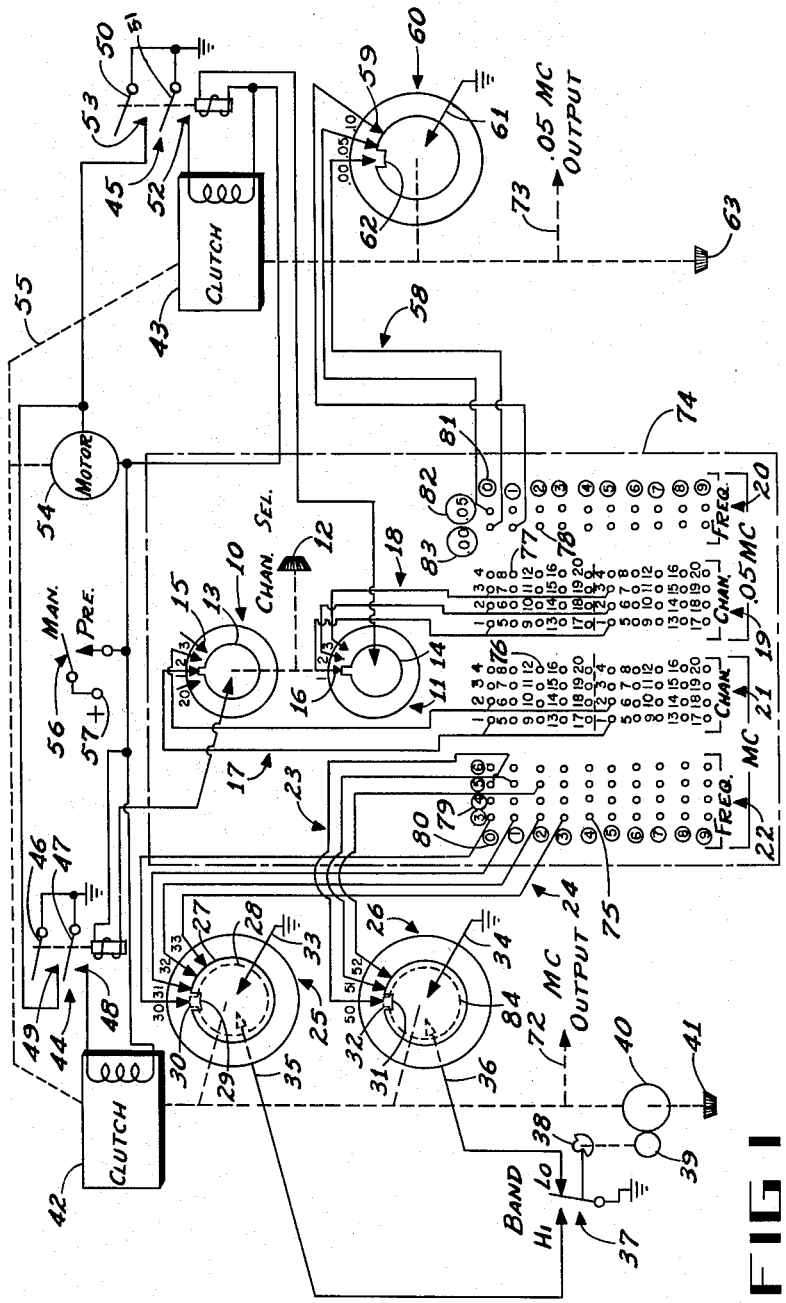

Sept. 19, 1961 E. A. TEDDLIE 3,001,119
CONNECTION-BOARD-SELECTOR SHAFT POSITIONING SERVOSYSTEM
Filed May 19, 1959 2 Sheets-Sheet 1

INVENTOR.
ERIC A. TEDDLIE
BY
ATTORNEY
AGENT

Sept. 19, 1961  E. A. TEDDLIE  3,001,119
CONNECTION-BOARD-SELECTOR SHAFT POSITIONING SERVOSYSTEM
Filed May 19, 1959  2 Sheets-Sheet 2
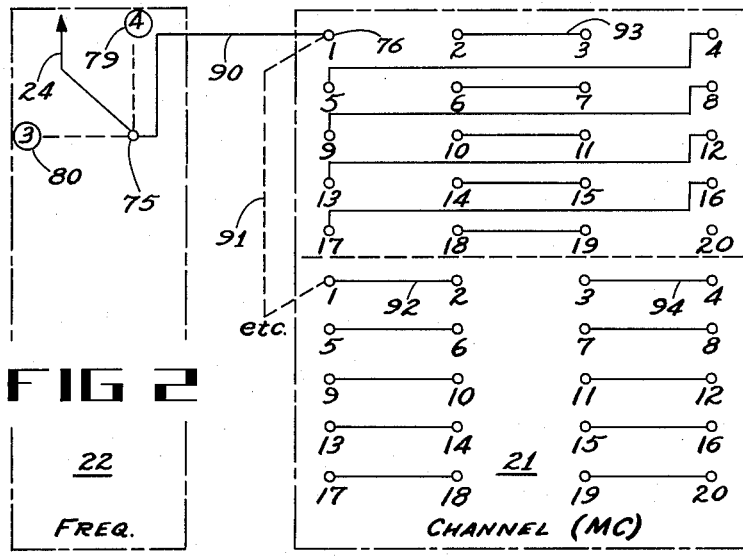
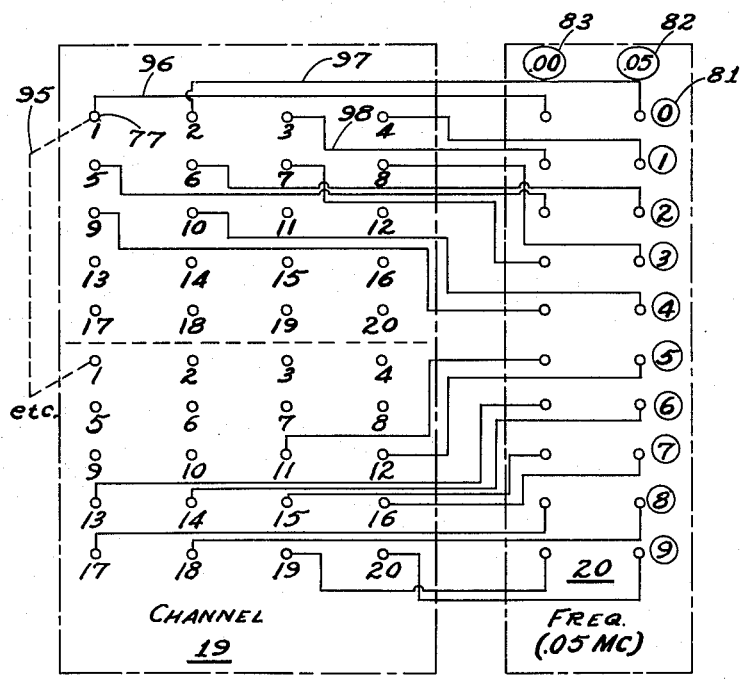
INVENTOR.
ERIC A. TEDDLIE
BY
ATTORNEY
AGENT

United States Patent Office 3,001,119
Patented Sept. 19, 1961

3,001,119
CONNECTION-BOARD-SELECTOR SHAFT
POSITIONING SERVOSYSTEM
Eric A. Teddlie, Dallas, Tex., assignor to Collins Radio
Company, Cedar Rapids, Iowa, a corporation of Iowa
Filed May 19, 1959, Ser. No. 814,333
6 Claims. (Cl. 318—467)

This invention relates generally to shaft positioning systems and more pariticularly to a seeking switch type of shaft positioning system wherein a plurality of discrete output shaft positions are controlled and wherein it is desired to set up a number of preset positions. For example, a shaft positioning system may be capable of controlling a relatively large number of output shaft positions and from this number a lesser number of preset shaft positions corresponding to positions of a channel selector switch or control may be desired for a particular control operation. For example, a radio might be tunable to 800 frequencies corresponding to 800 particular permutations of tuning shaft positions and it may be desired to select 20 of these possible frequencies for rapid selection by a channel selector control.

The invention concerns a seeking switch type of system wherein shaft rotation is imparted by a drive mechanism to an open circuit seeking switch in a well-known type of control wherein a channel selector switch supplies an energized voltage which finds its way back through the banks of seeking switches in such a manner that the drive motor is energized to position the switches until a discrete position is reached in each for which the ground is removed from the motor control supply. Such seeking switch control is described, for example, in the patent to Richard W. May and Horst M. Schweighofer, No. 2,476,673.

In prior art systems wherein a preselected number of output shaft positions is controlled in response to a channel selector switch position, and in which the number of preset positions is to be chosen from a larger number of possible positions, or in systems wherein a given number of concrolled positions is available and the permutive combinations of channel numbers and output shaft positions are to be selectively controlled, means have been provided to incorporate various banks of binary switches which may be positioned in accordance with a predetermined code to selectively set up the system such that certain shaft positions will correspond to the various preset channel selections. Preset control systems of this type are described in Patent No. 2,800,618 to J. P. Giacoletto et al., Patent No. 2,691,081 to Weber, and Patent No. 2,669,915 to R. T. Cox. Generally, such systems, in order to arrive at a desired preselection of output shaft positions for each channel to be selected, necessitate the use of a code list or other means by which the output shaft positions and the frequencies to which they correspond may be correlated to the particular permutations of binary switch settings to arrive at the desired control.

It is an object of the present invention to provide an improvement in the manner of preselecting desired settings of one or more functions which vary in discrete steps by utilizing a jackfield which permits the rapid selection of a complex function by a single control.

It is a further object of the present invention to provide a jackfield for incorporation in a channel positioning system which may be incorporated between the control switch (the channel selector switch) and the seeking switch or seeking switches which maintain shaft control.

It is a further object of this invention to provide a jackfield to effect desired preselected channel selection in a shaft positioning system whereby any one of a plurality of possible output shaft positions may be preset for a particular channel by the insertion of a patch cord in a matrix-like field by which the frequency corresponding to the particular channel may be read directly without reference to code lists or other correlative devices such as are necessary in channel preselection systems known in the art.

It is still a further object of the present invention to provide a preselection control in a shaft positioning system adaptable to shaft positioning systems effecting the control of a single output shaft or a plurality of output shafts.

Still another object of the present invention is the provision of a preselection control which may be readily incorporated with shaft positioning systems wherein the output shaft or shafts might be controlled through a single revolution or through a plurality of revolutions with the preset circuitry distinguishing between successive revolutions in the latter case.

Further objects and features of the present invention will become apparent from the following description and claims when read in view of the accompanying drawings, in which;

FIGURE 1 is a schematic diagram of a system for controlling two output shafts for the remote control of a radio apparatus incorporating a matrix jackfield preselection circuitry of the present invention;

FIGURE 2 is a diagram of the megacycle control patch field of FIGURE 1 illustrating the use of patch interconnections in accordance with a particular preselection control according to the present invention; and FIGURE 3 is a diagram of the .05 megacycle control portion of the jackfield of this invention illustrating the use of patch cords to effect a desired preselection control in accordance with the present invention.

The embodiment illustrated in FIGURE 1 shows the application of the jackfield of the present invention to two rotary switches forming the channel selector control for the remote control of a radio apparatus. This system illustrates two discrete controlled shaft outputs; the first, a megacycle control shaft and the second a 0.05 megacycle control shaft which might each control the selection of crystals to collectively tune the radio to a large number of frequencies corresponding to discrete step positions of the output shafts. The right-hand portion of FIGURE 1 shows circuitry for control of the .05 megacycle shaft and is a basic circuit for the control of a rotating device with 20 discrete positions in one revolution, where 20 possible presets are desired. The left-hand portion of FIGURE 1 illustrates circuitry to control a megacycle shaft and is an expansion of the basic circuit to one where the controlled switch (the seeking switch) must go through two revolutions, with the preset circuit distinguishing between successive revolutions.

The basic function of the channel selector switch and the controlled switches or seeking switches in the circuitry illustrated in FIGURE 1 is similar to the above-referenced patents in that the energizing source for a drive motor is connected through the channel selection switch and ultimately to the controlled switch or seeking switch to ground to complete the motor energizing circuit. The motor then through a drive mechanism rotates the output and the controlled or seeking switches until an open circuit is effected in the motor energizing circuit whereupon the output shaft rotation is stopped at a discrete rotational position.

In the embodiment illustrated in FIGURE 1, the megacycle output shaft 72 is positionable to 40 discrete shaft positions which might correspond to megacycle tuning steps from 30–69 megacycles respectively. The 0.5 megacycle output shaft 73 in the right-hand portion of the drawing is positionable to 20 discrete positions each indicative of 0.05 megacycle steps. Thus, for a complete revolution of output shaft 73, a difference in frequency of one megacycle is realized. Thus, 800 combinations of output shafts 72 and 73 are possible in 0.05 megacycle steps from 30–69.95 megacycles. Two possible modes of operation are illustrated in FIGURE 1 by the positioning of the function switch 56. With switch 56 in the manual position illustrated, the energizing potential 57 for the control motor is removed and the setting of the output shafts 72 and 73 may then be effected manually by rotation of tuning control knobs 41 and 63 respectively. With switch 56 in the opposite position illustrated, that is the preset position, the positive energizing source 57 is connected through switch 56 to the drive motor 54 and, additionally, through a first holding relay 44 to the rotor 13 of channel selector switch 10, as well as through holding switch 45 to the rotor 14 of channel selector switch 11. The control operation for the two output shafts 72 and 73 is similar. The control of output shaft 73, which is positionable to 20 discrete step positions within one revolution, will be first discussed. Channel selector switch 11 is positioned in accordance with the channel selector control knob 12 such that the positive drive voltage source 57 is connected through one of 20 contacts 16 located about the periphery of the stator portion of selector switch 11. Each of the peripheral contacts 16 is connected through a conductor 18 to the right-hand portion of the jackfield and, ultimately, through a conductor 58 to one of 20 peripheral stator contacts 59 of seeking switch 60. The rotor portion of seeking switch 60 is mechanically coupled to the output shaft 73 which is to be controlled. Seeking switch 60 is illustrated with the notched portion 62 of its rotor opposite the stator contact corresponding to 0.00 megacycle. The function of the 0.05 megacycle jackfield will be further discussed in detail; the function being primarily to connect the 20 peripheral contacts 16 of channel selector switch 11 (positions 1, 2 and 3 of which are illustrated) to the 20 peripheral stator contacts 59 of seeking switch 60 in an arbitrarily preselected permutation. Thus, in the circuitry as illustrated, channel 1 is selected by the channel selector knob 12 and the positive motor drive source 57 is connected through the rotor 14, channel selector switch 11, and through the matrix jackfield 19—20 to one of the 20 peripheral contacts 59 of seeking switch 60. At the instant that channel 1 is selected, motor 54 operates to position output shaft 73 and the rotor of seeking switch 60 until the notched portion 62 of the rotor lies opposite the peripheral contact 59 which is connected through the patch field to the channel 1 contact of channel selector switch 11. The positioning of the notch 62 opposite the particular stator contact 59 carrying the drive voltage for the selected channel removes the ground through wiper contact 61 and interrupts the motor drive.

The output shaft 55 of the motor is seen to be mechanically coupled through an electrically-operated clutch 43. Holding relay 45 is seen to be energized upon the selection of a given channel to complete a ground connection to the energizing coil of the clutch through contacts 51 and 52 and to provide a holding contact for motor 54 by providing a ground connection through relay contacts 50 and 53. This holding arrangement is incorporated into the drive system of FIGURE 1 since a single motor 54 is utilized to furnish the drive power for each of the output shafts 72 and 73. Thus, considering only the 0.05 megacycle output shaft 73, the motor 54, driving through clutch 43, positions the shaft 73 and the rotor of seeking switch 60 until an open circuit condition is realized. However, the motor 54 may continue to run until the other output shaft 72 is likewise properly positioned. It is seen that clutch 43 is energized only during that period of time when the output shaft 73 is being positioned; that is, during the time that the positive drive voltage 57 is completed to ground through channel selector switch 11 and seeking switch 60. When output shaft 73 reaches its selected position, the ground from wiper 61 on switch 60 is removed as described above and, thus, clutch 43 is de-energized due to the de-energization of holding relay 45 and the removal of the ground through relay contacts 51 and 52 to the clutch 43. Relay contacts 50 and 53 similarly remove ground from the motor 54. However, motor 54 may continue to run under the influence of the seeking switch and clutch drive arrangement related to the output shaft 72.

The control circuitry for the output shaft 72 incorporates a similar channel selector switch 10 in conjunction with a pair of seeking switches 25 and 26. Motor control voltage through switch 56 is similarly taken through a holding relay 44 to the rotor 13 of channel selector switch 10 and selectively connected to one of 20 peripherally-spaced stator contacts 15 through the left-hand portion 21—22 of the jackfield matrix to certain preselected ones of peripheral stator contacts on seeking switches 25 and 26. The embodiment illustrated provides an arrangement whereby output shaft 72 may be rotated through 40 rotational increments corresponding to two revolutions of output shaft 72. Thus, in the radio tuning arrangement illustrated, the 40 positions of output shaft 72 correspond to megacycle steps from 30–69 megacycles. The first megacycle seeking switch 25 controls output shaft 72 through a first complete revolution comprised of 20 discrete incremental steps corresponding to megacycle tuning from 30–49 megacycles inclusive, while a second seeking switch 26 controls output shaft 72 through a second revolution and provides 20 additional discrete incremental steps corresponding to megacycle tuning from 50–69 megacycles inclusive. Output shaft 72 is thus seen to be controlled through 40 steps in two revolutions by the incorporation of the two 20-position seeking switches 25 and 26 in conjunction with a high-low band switch 37 which selectively controls an additional ground contact to the rotors of seeking switches 25 and 26 such that no ambiguity is encountered during the two revolutions. The basic functioning of seeking switches 25 and 26 is similar to that associated with output shaft 73 (seeking switch 60) in that it provides a ground for completion of the motor drive control to output shaft 72 until an open circuit condition is realized to interrupt the motor drive.

Seeking switch 25 includes 20 rotor contacts corresponding to megacycle tuning steps 30—49 in conjunction with a front rotor 27 formed with a peripheral notch 29 and an inner rotor 28 of lesser diameter formed with a radially extending tab 30 aligned with the notch 29 on the front rotor. Front rotor 27 is grounded through a first wiper arm 33, while the rear rotor 28 is selectively grounded through a second wiper 35 in accordance with the position of the high-low band switch 37. As illustrated in FIGURE 1, high-low band switch 37 is operated by a cam 38 driven by a 2:1 gear reduction (gears 40 and 39) from output shaft 72. Cam 38 is so oriented that during the first revolution of the output shaft corresponding to megacycle output positions 30—49, the switch 37 is in low position and a ground is completed to the rear wiper 36 of seeking switch 26. Thus, during the first revolution, seeking switch 25, which corresponds to the low band of 30–49 megacycles, functions identically to the seeking switch 60 controlling output shaft 73 as above described. It is noted, however, that no ambiguity exists between the 30 megacycle shaft position in the first revolution and the 50 megacycle shaft position corresponding to the beginning of the second revolution of output shaft 72 since a ground is selectively provided by rear rotor 34 of seeking switch 26 to allow the control system to stop only on the desired position on seeking switch 25. Similarly, if a high band shaft position is selected, an additional ground is provided through the high-low band switch to seeking switch 25 such that the motor drive is not interrupted should seeking switch 25 pass through a corresponding position. Due to the 2:1 gear ratio driving cam 38, the seeking switch arrangement for output shaft 72 enables 40 discrete output positions in two complete revolutions. It is obvious that this fundamental system might be expanded over any number of revolutions by adapting the high-low band switch 37 and cam 38 accordingly.

The clutch 42 and holding switch 44 which control the drive to output shaft 72 are identical to that discussed in regard to the corresponding clutch 43 and holding switch 45 for the output shaft 73. It is seen that the system described enables a single drive motor to selectively position two output shafts in that the motor continues to be energized until each of the shafts reaches its selected position.

The matrix jackfield arrangement of the present invention enables rapid preselection of the positions of output shafts 72 and 73 by changing the permutations of the possible connections between the channel selector switch rotors and the seeking switch rotors. The patch field arrangement, in addition to enabling channel preselection (in the example illustrated, the selection of any one of 800 possible output shaft position combinations) to any one of 20 preselected channels), enables a direct indication of channel versus frequency and eliminates the necessity for any precoding arrangement as by use of tuning charts, etc.

The megacycle portion of the matrix is seen to be made up of two groups of jacks, a first group 22 corresponds to 40 different megacycle shaft positions from 30–69 megacycles. The arrangement of the megacycle frequency jacks 22 is in a matrix-like pattern. Forty jacks 75 are provided in an arrangement of four columns of ten each. Each row of jacks is labeled 0–9 respectively and each column of jacks is labeled 3–6 respectively. In matrix fashion therefore, each column corresponds to the 10's digit and each row corresponds to unit digits. Thus, for example, the jack in the first row and first column is seen to correspond to 30 megacycles by direct reading of the corresponding column and row references 79 and 80 and this jack is seen to be connected to the stator contact of seeking switch 25 corresponding to 30 megacycles. Similarly, the jack in the first column and second row corresponds to 31 megacycles by reading of the column and row references respectively and is connected to the stator contact of seeking switch 25 corresponding to 31 megacycles. In similar fashion, stator contacts on seeking switch 25 corresponding to 32 and 33 megacycles are connected to jacks in the matrix field 22 in corresponding row and column positions to enable direct reading.

The megacycle portion of the matrix additionally includes a second group of jacks indicated as channel jacks 21. Each of these jacks is numbered from channel 1–20 and there are two jacks corresponding to each channel position. The corresponding channel jacks are interconnected, as indicated for channels 1 and 2, and in turn connected to corresponding stator contacts on channel selector switch 10 which controls the megacycle positions. The double group of channel jacks in the jack field 21 are included such that patch connections may be completed for any of the possible combinations desired without placing more than one patch into a given jack. This feature will be further described.

The matrix jackfield further comprises two additional groups of jacks 19 and 20 to selectively set up positions of the 0.05 megacycle output shaft 73 for channels 1–20. In similar fashion to the group of jacks 21, jack field 19 comprises two groups of jacks each labeled 1–20 with corresponding jacks interconnected as illustrated for channels 1, 2 and 3. Each of the channel jacks in the field 19 is connected to corresponding stator connectors on the channel selector switch 11.

Connections to the 0.05 megacycle seeking switch 60 are selectively completed through a second group of frequency jacks 20. In the illustration shown, it is desired that output shaft 73 be positionable through 20 discrete positions corresponding to 0.05 megacycle increments. It is noted that each of the 20 stator terminals 59 on seeking switch 60 are connected to individual jacks in the jackfield 20. A direct reading feature is here again available. The jackfield 20 is seen to be comprised of two columns of ten jacks each. The first column is identified as the 0.00 column and the second column is identified as 0.05 by means of references 83 and 82 respectively. References 81 identify the jacks vertically from 0–9. Thus, the 0.00 stator contact on seeking switch 60 is seen to be connected to the top jack in the first row which by reading of the references 81 and 83 is seen to correspond to 0.00 megacycles. Correspondingly, the stator contact of seeking switch 60 corresponding to 0.05 megacycle is connected to the top jack in the second column which by direct reading of references 81 and 82 is seen to correspond to 0.05 megacycle. Each of the stator contacts 59 of seeking switch 60 is similarly connected to the matrix field 20 such that the corresponding 0.05 megacycle incremental step is directly readable from the row and column indicia outside the jacks in jackfield 20.

In operation, to set up the shaft positioning system to 20 preselected channels wherein each of the 20 preselected channels may correspond to any one of the 800 combinations of output shaft positions, it is necessary only to insert a patch cord between a channel number jack in jackfield 21 to a desired frequency jack in jackfield 22 to arrive at the megacycle output position and to correspondingly connect the same jack number in jackfield 19 by a second patch cord to the desired 0.05 megacycle incremental frequency in jackfield 20. It is seen that this preselection may be accomplished rapidly, and direct indication of frequency versus channel number is at all times possible by simple row and column identification in the frequency portions of the jackfield. Thus, no coding or complicated presetting of switch arrangements against tuning charts is necessary and the system enables one to directly identify channel numbers with frequency and further enables a rapid change of selected frequencies for particular channels in the event a prescribed channel coding is to be immediately changed as, for example in security considerations.

FIGURE 2 illustrates the megacycle portion of the jackfield including the frequency identifying patch field 22 and the corresponding channel identifying jack field 21 with patch cords inserted such that the first two digits of the 20 preset channels would all be 23 megacycles. For this condition, a patch cord 90 need only be inserted between jack 75 in jack field 22 and jack 76 in jack field 21 and additional cords inserted in jack field 21 such that all the channel jacks in the field are connected to jack 75 in jack field 22. As previously described, jack field 21 consists of two groups of 20 jacks each identified as channels 1–20 and corresponding channel numbers are interconnected as shown by interconnection 91. Thus, in addition to the initial patch cord 90, a pattern of patch cords in patch field 21 is illustrated whereby channel 1 is interconnected to channel 2 through patch cord 92, channel 2 is interconnected to channel 3 through patch cord 93, channel 3 is interconnected to channel 4 through patch cord 94, and so on. This arrangement effectively connects jack 75 in jackfield 22 (which corresponds to 43 megacycles by direct reading of the references 79 and 80) to the single stator contact on seeking switch 25 corresponding to the 43 megacycle position. For each of the 20 channels selected, seeking switch 25 will control the drive to output shaft 72 such that it corresponds to a single position to realize 43 megacycles. The jackfield arrangement illustrated in FIGURE 2 shows that sufficient jacks are provided in jack field 21 such that each jack need only receive a single patch cord. Twenty patch cords inserted as illustrated in FIGURE 2 set up the megacycle output shaft at an identical position for all 20 selected channels. Obviously, the jackfield arrangement may be set up such that each channel corresponds to a different megacycle frequency or that various numbers of the 20 possible channels may be set up on the same megacycle frequency. All possible permutations may be made by the insertion of patch cords and the frequency corresponding to a particular channel may be directly indicated from the jackfield.

FIGURE 3 illustrates a particular patch cord arrangement in conjunction with the 0.05 megacycle portion of the jackfield matrix whereby each of the 20 channels successively corresponds to one of the 20 possible 0.05 megacycle increments from 0.00 to 0.95 megacycle. Thus, the channel 1 jack 77 on jackfield 19 need only be connected by a patch cord 96 to the top jack in the first column in jackfield 20 to realize 0.00 megacycle for channel 1. Similarly, channel jack 2 in jackfield 19 is connected by a patch cord 97 to the top jack in the second column of jackfield 20 such that channel 2 corresponds to 0.05 megacycle. Each of the remaining jack channels then is similarly connected to a discretely different jack in the frequency jackfield 20 to preset all of the possible 0.05 megacycle increments. It can be that the provision of two channel jacks for each possible channel and the interconnections 95 make possible the presetting of any desired channel-versus-frequency permutation by the corresponding placement of a patch cord from a desired channel number to a desired frequency jack.

The present invention is then seen to provide a novel presetting arrangement and a shaft positioning system whereby any one of the possible output shaft permutations may be effected by the insertion of patch cords in the jackfield matrix to the desired preset arrangement such that the proper interconnection is effected between the channel selector switch and the controlled shaft seeking switch or switches to effect the necessary rotation to correspond to the particular selected presettings. The invention provides a presetting arrangement by which any desired permutations may be preset between the channel numbers and tuning shaft positions and enables the direct indication from the jackfield of channel versus tuned frequency. The matrix jackfield of this invention might readily be incorporated in a remote tuning control indicated within the dotted line 74 of FIGURE 1 whereby the operator may readily change the coding as concerns channels versus tuned frequency without reference to tuning charts, coding lists, etc. and in which a position identification may be made of the correlation between channel and tuned frequency by direct reading from the jackfield indexes of channel versus frequency. The presetting arrangement of the present invention is seen to be adaptable without ambiguity to shaft positioning systems incorporating a single shaft output or a plurality of shaft outputs and further is adaptable without ambiguity to uniturn shaft positioning control or multiturn shaft positioning control.

Although this invention has been described with respect to particular embodiments thereof, it is not to be so limited as changes and modifications may be made therein which are within the full intended scope of the invention as defined by the appended claims.

I claim:

1. A shaft positioning control system comprising a selectively positionable control switching means, an open seeking switching means operably connected to a controlled shaft, controlled shaft driving means and control means therefore including an energizing source, said energizing source connected to the rotor of said control switching means, the rotor of said control switching means selectively engageable with individual ones of a plurality of peripherally disposed stator contacts on said control switching means, a matrix jackfield comprised of a first group of $n$ jacks and a second group of $m$ jacks, each of said first group of $n$ jacks individually connected to one of said control switch stator contacts, each of said second group of $m$ jacks individually connected to like peripherally disposed stator contacts of said open seeking switching means, the rotor of said seeking switch means connected to ground and maintaining peripheral sliding contact with each of said seeking switch stator contacts, said seeking switch rotor formed with a peripherally disposed insulating slot therein, said seeking switch rotor operably connected to rotate with said controlled shaft such that said peripherally disposed slot therein is successively juxtaposed with individual ones of said stator contacts and patch cord means for effecting preselected interconnections between said first and second groups of jacks respectively whereby said control switch stator contacts may be selectively interconnected with selected ones of said seeking switch stator contacts in any of $n \times m$ permutable combinations.

2. A shaft positioning control system comprising a selectively positionable control switching means, an open seeking switching means operably connected to a controlled shaft, shaft driving means connected to said controlled shaft and control means therefore including an energizing source, one terminal of said energizing source connected to the rotor of said control switching means and the other terminal thereof grounded, the rotor of said control switching means selectively engageable with individual ones of a plurality of $n$ peripherally disposed stator contacts on said control switching means, a matrix jackfield comprised of a first group of $n$ pairs of jacks with each jack pair having an interconnection therebetween, a second group of $m$ jacks, each of said first group of $n$ pairs of jacks individually connected to one of said control switch stator contacts, each of said second group of $m$ jacks individually connected to one of $m$ peripherally disposed stator contacts on said open seeking switching means, the rotor of said seeking switch means connected to ground and maintaining peripheral sliding contact with each of said seeking switch stator contacts, said seeking switch rotor formed with a peripherally disposed insulating slot therein, said seeking switch rotor operably connected to rotate with said controlled shaft such that said peripherally disposed slot in the rotor thereof is successively juxtaposed with individual ones of said $m$ stator contacts, and patch cord means for effecting preselected interconnections between said first and second groups of jacks respectively whereby $n \times m$ permutable connections between said control switch stator contacts and said seeking switch stator contacts may be selectively effected.

3. A shaft positioning control system comprising a selectively positionable control switching means, an open seeking switching means operably connected to a controlled shaft, shaft driving means connected to said controlled shaft and control means therefore including an energizing source, one terminal of said energizing source grounded and the other terminal thereof connected to the motor of said control switching means, the rotor of said control switching means selectively engageable with individual ones of a plurality of $n$ peripherally disposed stator contacts on said control switching means; a matrix jackfield comprised of a first group of $n$ pairs of jacks with each jack pair having an interconnection therebetween, a second group of $m$ jacks, each of said first group of $n$ pairs of jacks individually connected to one of said control switch stator contacts, each of said second group of $m$ jacks individually connected to one of $m$ peripherally disposed stator contacts of said open seeking switching means, said group of $m$ jacks arranged in a matrix pattern of rows and columns with a row arranged for each units digit in the factor $m$ and a column arranged for each 10's digit in the factor $m$, each of said $m$ jacks identifying one of said $m$ stator contacts as to 10's and units digit by its respective matrix row and column location, and means identifying each of said $n$ pairs of jacks with one of said $n$ stator contacts; the rotor of said seeking switch means connected to ground and maintaining peripheral sliding contact with each of said seeking switch stator contacts, said seeking switch rotor formed with a peripherally disposed insulating slot therein, said seeking switch rotor operably connected to rotate with said controlled shaft such that said peripherally disposed slot in the rotor thereof is successively juxtaposed with individual ones of said $m$ stator contacts, and patch cord means for effecting preselected interconnections between said first and second groups of jacks respectively whereby said control switch stator contacts may be selectively interconnected with said seeking switch stator contacts in any one of $n \times m$ permutable combinations.

4. A matrix-controlled switching arrangement for effecting interconnection between a first group of $n$ terminals and a second group of $m$ terminals in all possible interconnection permutations therebetween comprising a first plurality of $n$ pairs of jacks with each jack pair having an interconnection therebetween and each pair individually connected to one of said $n$ terminals, a second plurality of $m$ jacks each connected to an individual one of said second group of $m$ terminals, and a plurality of $n$ jumper connections selectively insertable between certain ones of said first and second pluralities of jacks each selectively effecting one of $n \times m$ possible interconnections between said first and second groups of terminals respectively.

5. A matrix-controlled switching arrangement for effecting interconnection between a first group of $n$ terminals and a second group of $m$ terminals in all possible interconnection permutations therebetween comprising a first plurality of $n$ pairs of jacks with each jack pair having an interconnection therebetween and each pair individually connected to one of said $n$ terminals, a second plurality of $m$ jacks with each of said $m$ jacks connected to an individual one of said second group of $m$ terminals, said first plurality of $m$ jacks arranged in a matrix pattern of rows and columns with a row arranged for each units digit in the factor $m$ and a column arranged for each 10's digit in the factor $m$, a plurality of $n$ jumper connections selectively insertable between selected ones of said first and second plurality of jacks, each said jumper connection selectively effecting one of $n \times m$ possible interconnections between said first and second groups of terminals respectively, each of said $m$ jacks identifying one of said $m$ terminals as to 10's and units digit by its respective matrix row and column location, each of said pairs of $n$ jacks connected to a selected one of said $n$ terminals, and means identifying each of said $n$ pairs of jacks with one of said $n$ terminals.

6. A shaft positioning control system comprising a plurality of selectively positionable control switching means, a plurality of open seeking switching means each operably connected to one of a plurality of controlled shafts, shaft driving means operably connected to each said controlled shaft and control means therefore including an energizing source, said energizing source connected to the rotors of each of said control switching means, the rotors of each said control switching means selectively engageable with individual ones of a plurality of peripherally disposed stator contacts on an associated one of each of said plurality of control switching means, a matrix jackfield comprised of a plurality of groups of $n$ pairs of jacks and a plurality of groups of $m$ jacks, the jacks in each of said plurality of groups of $n$ pairs of jacks individually connected to the stator contacts of one of said plurality of control switching means, the jacks in each of said plurality of groups of $m$ jacks individually connected to like peripherally disposed stator contacts of an associated one of said plurality of open seeking switching means, the rotors of each said seeking switch means connected to ground and maintaining peripheral sliding contact with each associated stator contacts, each said seeking switch rotor formed with a peripherally disposed insulating slot therein, each said seeking switch rotor operably connected to rotate with an associated controlled shaft such that said peripherally disposed slot therein is successively juxtaposed with individual ones of associated stator contacts, a clutch means operably connected between each said controlled shaft and the seeking switches associated therewith, each clutch means having a clutch control means connected to said energizing means and adapted to open the associated clutch when said energizing means is opened, means for effecting by means of patch cords preselected interconnections between jacks in each said plurality of groups of $m$ jacks and jack pairs in one of said plurality of $n$ pairs of jacks whereby the control switch stator contacts of each said control switching means may be selectively interconnected with selected ones of said seeking switch stator contacts of an associated seeking switch means and $m \times n$ interconnections may be effected between associated groups of the pluralities of $m$ jacks and $n$ pairs of jacks.

References Cited in the file of this patent

UNITED STATES PATENTS 2,286,812     Keefe _____ June 16, 1942

OTHER REFERENCES

International Dictionary of Physics and Electronics, page 654, D. Van Nostrand, New York, 1956.